United States Patent
Nakajima

(10) Patent No.: US 10,628,102 B2
(45) Date of Patent: Apr. 21, 2020

(54) JOB-SPECIFIC CONTROL PROCESSING FOR AN IMAGE PROCESSING APPARATUS

(71) Applicant: CANON KABUSHIKI KAISHA, Tokyo (JP)

(72) Inventor: Junko Nakajima, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/258,400

(22) Filed: Jan. 25, 2019

(65) Prior Publication Data
US 2019/0243592 A1 Aug. 8, 2019

(30) Foreign Application Priority Data
Feb. 2, 2018 (JP) .................. 2018-017492

(51) Int. Cl.
| | |
|---|---|
| *G06F 15/00* | (2006.01) |
| *G06F 3/12* | (2006.01) |
| *G06K 1/00* | (2006.01) |
| *G06F 21/31* | (2013.01) |
| *H04N 1/00* | (2006.01) |
| *G06F 3/0482* | (2013.01) |
| *G06F 21/60* | (2013.01) |

(52) U.S. Cl.
CPC .......... *G06F 3/1274* (2013.01); *G06F 3/0482* (2013.01); *G06F 21/31* (2013.01); *G06F 21/608* (2013.01); *H04N 1/00413* (2013.01); *H04N 1/00482* (2013.01)

(58) Field of Classification Search
CPC ...... G06F 3/1274; G06F 3/0482; G06F 21/31; H04N 1/00413; H04N 1/00482
USPC ................................ 348/1.13, 1.14, 1.15, 1.1
See application file for complete search history.

(56) References Cited

U.S. PATENT DOCUMENTS

| | | | |
|---|---|---|---|
| 2017/0199710 A1* | 7/2017 | Ando | G06F 3/1222 |
| 2019/0121584 A1* | 4/2019 | Inoue | H04N 1/00503 |

FOREIGN PATENT DOCUMENTS

JP 8-6745 A 1/1996

* cited by examiner

*Primary Examiner* — Douglas Q Tran
(74) *Attorney, Agent, or Firm* — Canon U.S.A., Inc., IP Division

(57) ABSTRACT

An image forming apparatus is provided that executes processing that, when a request to stop a print job is received during a job suspension, it is determined whether a login user ID of a user who is logged in and a job execution user ID of a user who has executed a job coincide with each other. In a case where the login user ID and the job execution user ID do not coincide with each other, an authentication request is received, and in a case where a user ID of an authenticated user coincides with the job execution user ID, the job is stopped.

14 Claims, 18 Drawing Sheets

FIG.9

| JOB ID 901 | JOB EXECUTION USER ID 902 | JOB NAME 903 | RECEPTION DATE AND TIME 904 | STATUS 905 |
|---|---|---|---|---|
| 0000 | user_00 | MEETING MATERIAL.doc | MAY 30, 2017 9:25:00 | EXECUTING |
| 0001 | user_01 | SUBMISSION MATERIAL.xls | MAY 30, 2017 9:25:30 | IDLING |
| 0002 | user_00 | MEETING SUPPLEMENTARY MATERIAL.doc | MAY 30, 2017 9:27:00 | IDLING |
| 0003 | user_02 | SUPPLEMENTARY MATERIAL.xls | MAY 30, 2017 9:27:10 | IDLING |
| 0004 | user_01 | SUPPLEMENTARY MATERIAL.xls | MAY 30, 2017 9:28:30 | IDLING |
| | | | | |

JOB-SPECIFIC CONTROL PROCESSING FOR AN IMAGE PROCESSING APPARATUS

BACKGROUND

Field

The present disclosure relates to a job suspension and stop control of an image processing apparatus.

Description of the Related Art

As a job processing apparatus having a plurality of processing functions, an image processing apparatus such as a digital multifunction apparatus has been known. Such a digital multifunction apparatus includes processing functions such as copy, print, scan, e-mail transmission, and facsimile transmission/reception. The digital multifunction apparatus can also execute processing functions such as storing of digital data in a storage device and retrieving digital data from the storage device.

In the image processing apparatus described above, while a plurality of jobs can be input, in a case where a job is erroneously input, it can be difficult to immediately select a job from a list and stop the job.

In order to solve the above problem, an image processing apparatus is provided as disclosed in Japanese Patent Application Laid-Open No. H8-6745, which can suspend, when there is a request to suspend a job from a user, all jobs in response to such a request, perform a stop operation by selecting a job to be stopped, and thereafter restarting other jobs. Such an image processing apparatus suspends all the jobs first, and is thus convenient in a case where it is needed to urgently suspend the job.

In the related art, since an operation of a job of a user other than a user who is logged into an image processing apparatus is restricted, the job of the user other than the user who is logged into the image processing apparatus cannot be stopped. Therefore, in the image processing apparatus described above, even if a request to suspend a job input by the user other than the user who is logged into the image processing apparatus is made in order to stop the job, the job cannot be stopped in a case where another user other than the user who has input the job is logged into the image processing apparatus or in a case where the user who has input the job has not yet logged into the image processing apparatus.

SUMMARY

According to an aspect of the present disclosure, an image processing apparatus includes an acquisition unit configured to acquire user-identification information of a user who has logged into the image processing apparatus, a storage unit configured to store a job and user-identification information of a user who has input the job in association with each other, a display unit configured to display a job list screen, a stop unit configured to stop a job selected on the job list screen, and a determination unit configured to determine whether the acquired user-identification information and the user-identification information of the user who has input the selected job coincide with each other, wherein in a case where the determination unit determines that the acquired user-identification information and the user-identification information of the user who has input the selected job do not coincide with each other, the display unit displays a user authentication screen on the display unit.

Further features will become apparent from the following description of exemplary embodiments with reference to the attached drawings.

BRIEF DESCRIPTION OF THE DRAWINGS

FIG. 9 is a diagram schematically illustrating a print job queue of the image processing apparatus.

DESCRIPTION OF THE EMBODIMENTS

Hereinafter, an image processing apparatus serving as a job processing apparatus according to an exemplary embodiment of the present disclosure will be described with reference to the drawings.

Figure 1:
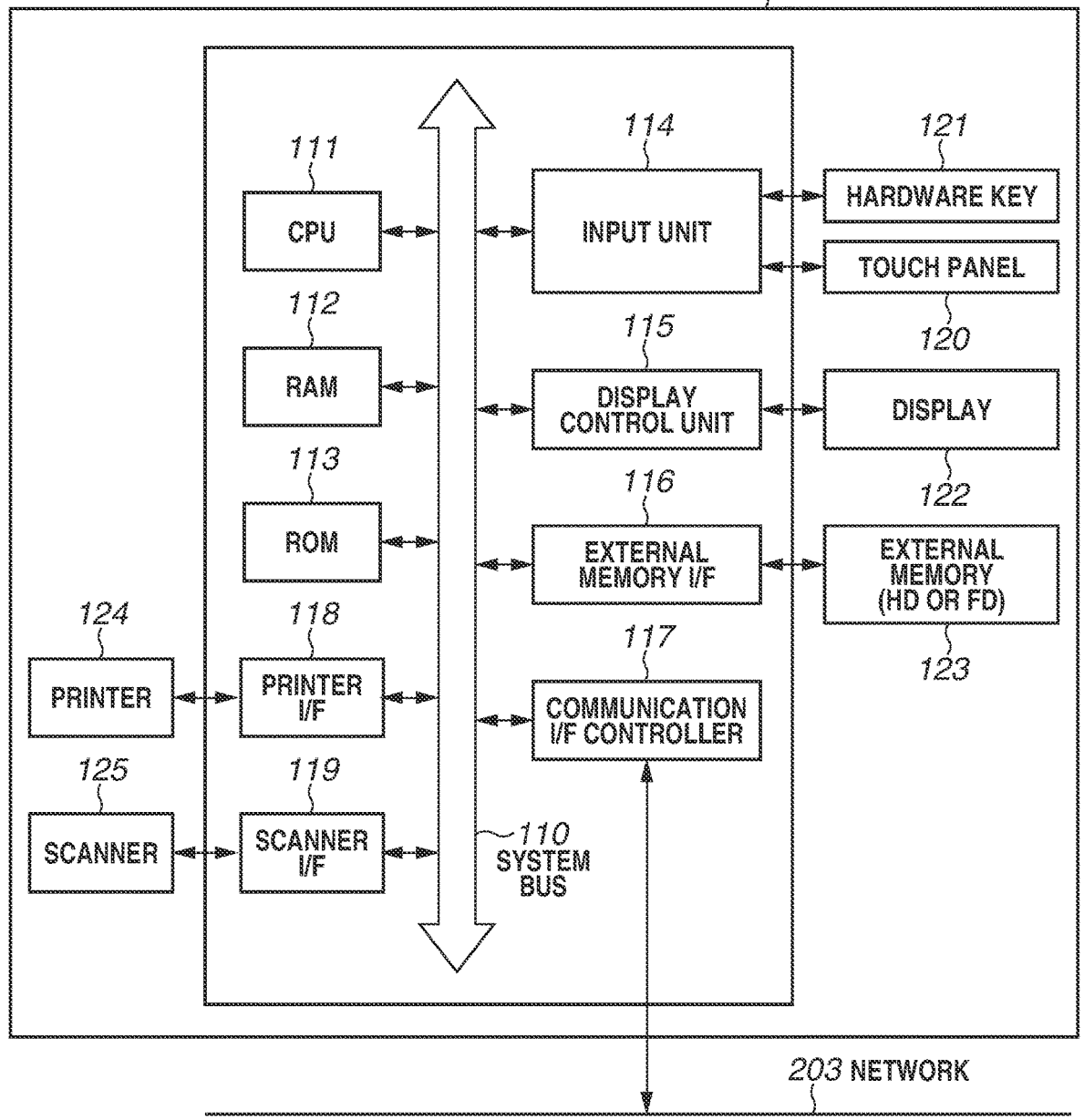
FIG. 1 is a block diagram illustrating a hardware configuration of an image processing apparatus according to an exemplary embodiment.

FIG. 1 is a block diagram illustrating a hardware configuration of an example of an image processing apparatus 100 serving as the job processing apparatus according to the exemplary embodiment.

As illustrated in FIG. 1, a central processing unit (CPU) 111, a random access memory (RAM) 112, a read only memory (ROM) 113, an input unit 114, a display control unit 115, an external memory interface (I/F) 116, a communication I/F controller 117, a printer I/F 118, and a scanner I/F 119 are connected to a system bus 110. A touch panel 120 and a hardware key 121 are connected to the input unit 114. A display 122 is connected to the display control unit 115. An external memory 123 is connected to the external memory I/F 116. A printer 124 is connected to the printer I/F 118, and a scanner 125 is connected to the scanner I/F 119. The respective units connected to the system bus 110 can exchange data with each other through the system bus 110.

The ROM 113 is a non-volatile memory. Data such as image data and various programs for an operation of the CPU 111 are stored in predetermined areas of the ROM 113. The RAM 112 is a volatile memory, and is used as a temporary storage area such as a main memory and a work area of the CPU 111. The CPU 111 controls the respective units of the image processing apparatus 100 using the RAM 112 as a work memory in accordance with, for example, the programs stored in the ROM 113. The programs for an operation of the CPU 111 are not necessarily stored in the ROM 113, and can be stored in advance in the external memory (a hard disk or the like) 123.

The input unit 114 receives a user operation, generates a control signal in response to the user operation, and supplies the control signal to the CPU 111. The input unit 114 is connected to the touch panel 120 and the hardware key 121 as input devices that receive the user operation. The touch panel 120 is an input device configured to output coordinate information corresponding to a touched position with respect to an input unit configured in a planar form, for example. Any one of various types of touch panels such as a resistive film type or a capacitive type, a surface acoustic wave type, an infrared type, an electromagnetic induction type, an image recognition type, or an optical sensor type can be used.

The hardware key 121 is an input device that can be physically pressed, such as a numeric key, a start key, or a stop key. The CPU 111 controls the respective units of the image processing apparatus 100 based on the programs, based on the control signal generated and supplied by the input unit 114 in response to the user operation performed on the input device. Thus, it is possible to cause the image processing apparatus 100 to perform an operation corresponding to the user operation.

The display control unit 115 outputs a display signal for displaying an image to the display 122. The CPU 111 supplies a display control signal generated based on the program to the display control unit 115. The display control unit 115 generates the display signal based on the display control signal, and outputs the generated display signal to the display 122. The display control unit 115 causes the display 122 to display a graphical user interface (GUI) screen constituting a GUI based on the display control signal generated by the CPU 111.

The touch panel 120 is integrally configured with the display 122. For example, the touch panel 120 is installed on an upper layer of a display surface of the display panel 122 such that light transmittance does not interfere with the display of the display 122. And an input coordinate in the touch panel 120 and a display coordinate on the display 122 are associated with each other. Thus, a user can directly operate a GUI screen displayed on the display 122.

The external memory 123 such as a hard disk, a floppy disk, a compact disk (CD), a digital versatile disk (DVD), or a memory card can be connected to the external memory IF 116. Under control of the CPU 111, data is read from the connected external memory 123 or is written to the external memory 123. The communication IF controller 117, under control of the CPU 111, performs communication with various networks 203 such as a local area network (LAN), the Internet, a wired network, and a wireless network. The scanner I/F 119 controls image input from the scanner 125. The printer I/F 118 controls image output to the printer 124.

<Configuration of Network System>

Figure 2:
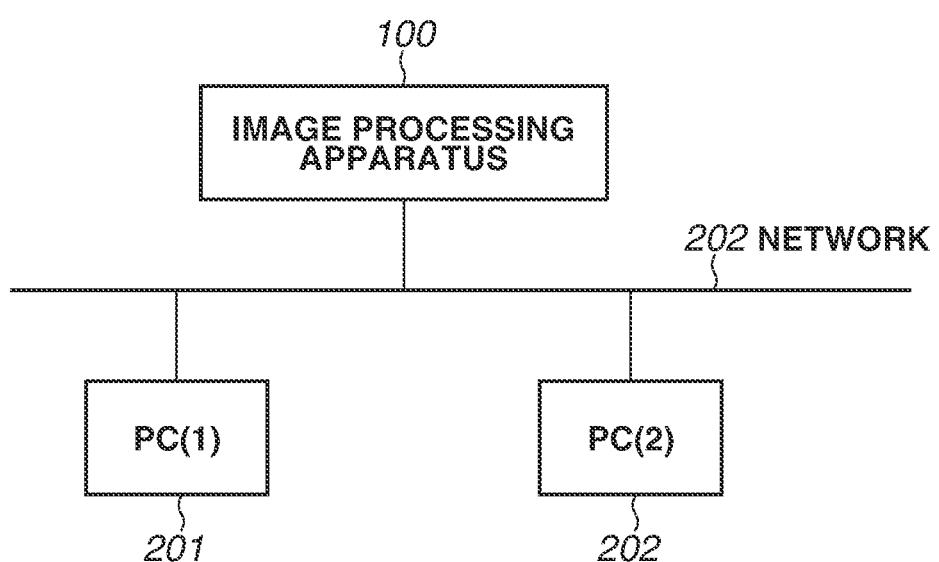
FIG. 2 is a block diagram illustrating a network configuration of a system in which the image processing apparatus is operated.

FIG. 2 is a block diagram illustrating a configuration of a network system to which the image processing apparatus 100 illustrated in FIG. 1 is connected.

In an illustrated example, personal computers (PCs) PC(1) 201 and PC(2) 202 are connected to the image processing apparatus 100 through the network 203. The PC(1) 201 is an authentication server apparatus, and the PC(2) 202 is a terminal to which the user inputs a print job. In the illustrated example, while the two PCs, that is, the PC(1) 201 and the PC(2) 202 are illustrated, more than two PCs can be connected to the network 203.

<Hardware Configuration of PC>

Figure 3:
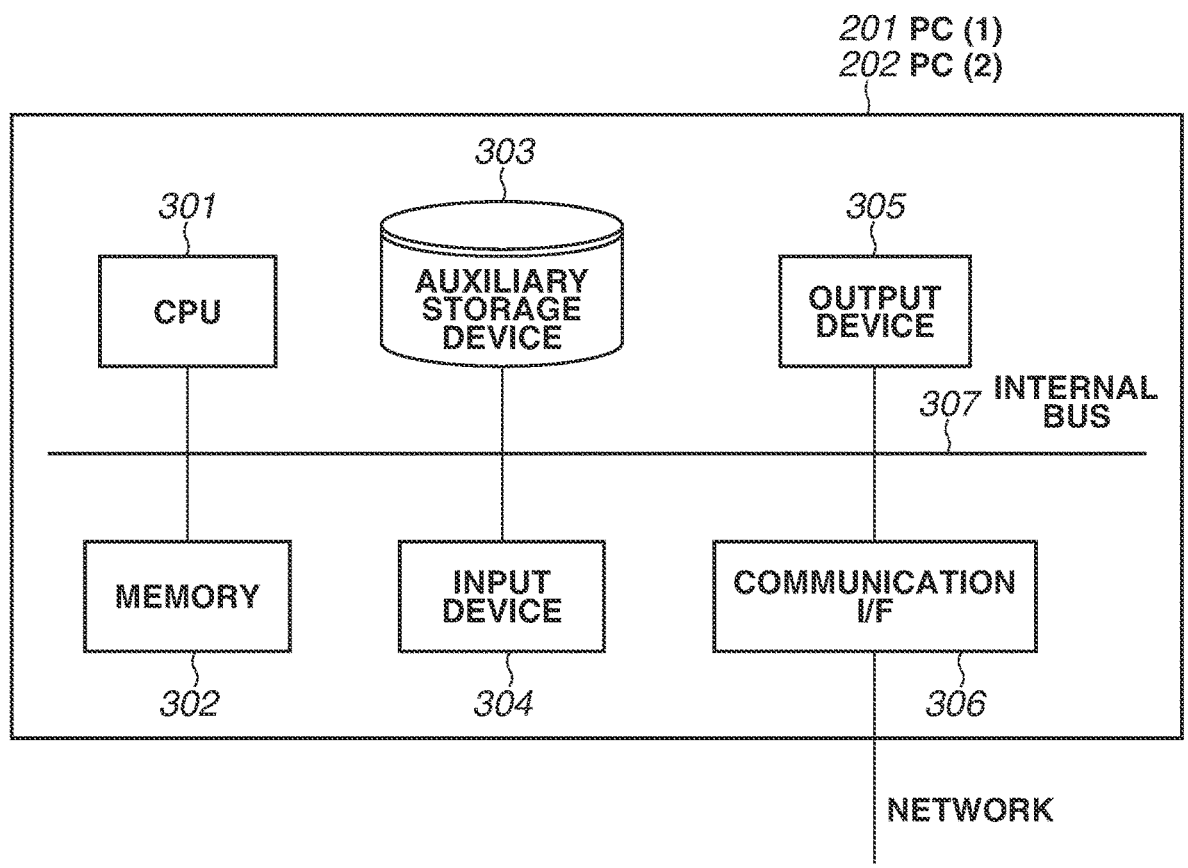
FIG. 3 is a block diagram illustrating a hardware configuration of a personal computer (PC).

FIG. 3 is a block diagram illustrating a hardware configuration of the PC(1) 201 and the PC(2) 202 illustrated in FIG. 2. Since the hardware configurations of the PC(1) 201 and the PC(2) 202 are the same, the hardware configuration of the PC(1) 201 will be mainly described below.

The PC(1) 201 includes a CPU 301, a memory 302, an auxiliary storage device 303, an input device 304, an output device 305, and a communication I/F 306. The CPU 301, the memory 302, the auxiliary storage device 303, the input device 304, the output device 305, and the communication I/F 306 are connected to one another via an internal bus 307.

The CPU 301 manages entire control of the PC(1) 201. The memory 302 includes a RAM and a ROM, and stores a program and various data. The auxiliary storage device 303 is a large-capacity storage device such as a hard disk, and stores large volumes of data and stores an execution code of the program. The auxiliary storage device 303 stores, for example, data that needs to be stored for a longer period of time as compared with data stored in the memory 302.

The input device 304 is a keyboard, a pointing device, or the like, and the user inputs various instructions to the PC(1) 201 using the input device 304. The output device 305 is, for example, a display, and processing executed by the CPU 301 is displayed on the output device 305. The communication I/F 306 transmits/receives digital data through the network 203.

Figure 4:
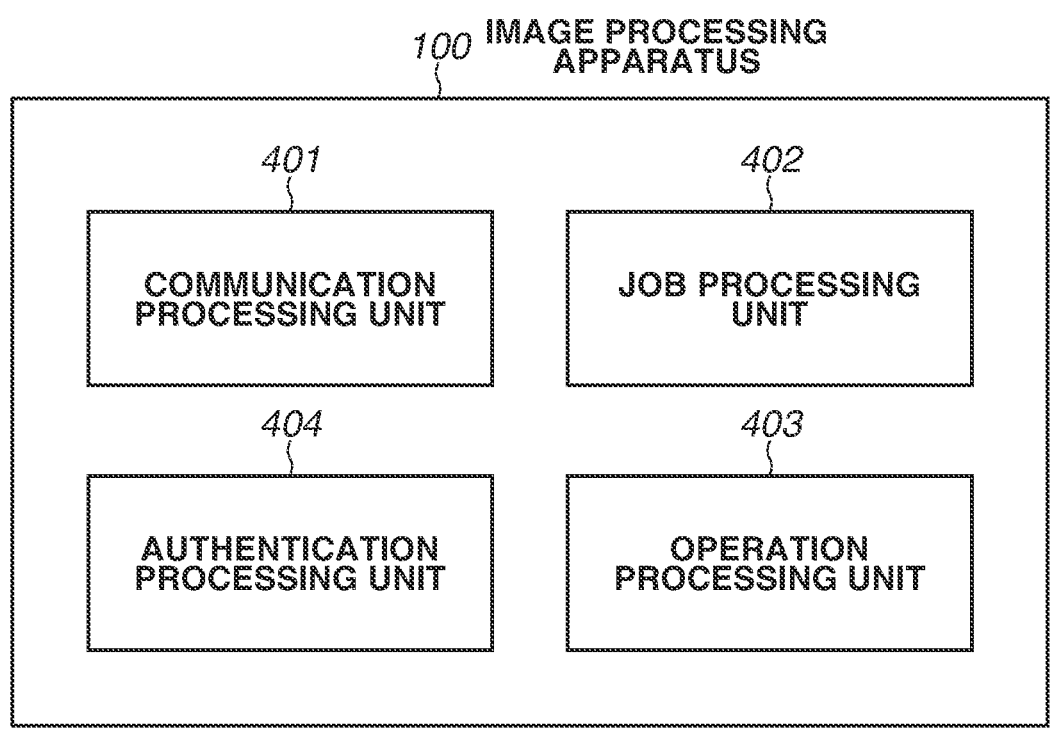
FIG. 4 is a block diagram illustrating processing functions of the image processing apparatus.

FIG. 4 is a block diagram illustrating an example of functions of the image processing apparatus 100 illustrated in FIG. 1. The image processing apparatus 100 includes, as functions thereof, a communication processing unit (communication processing means) 401, a job processing unit (job processing means) 402, an operation processing unit (operation processing means) 403, and an authentication processing unit (authentication processing means) 404. Each processing unit described above functions when the CPU 111 reads the program stored in the ROM 113 or in the external memory 123 and loads the program into the RAM 112 and executes the program.

<Processing Function of Image Processing Apparatus>

The communication processing unit 401 executes communication control and analysis of communication commands. The communication commands are transmitted/received via the communication I/F controller 117 to/from the PC(1) 201, the PC(2) 202, and the like, connected to the network 203.

The job processing unit 402 performs processing of various jobs to be executed by the image processing apparatus 100. Specifically, the job processing unit 402 executes a print job by controlling the printer 124, a scan job by controlling the scanner 125, and a transmission job by controlling the communication L/F controller 117. In addition, the job processing unit 402 performs suspension processing and stop processing of the various jobs described above.

The operation processing unit 403 controls the display control unit 115 to display various pieces of information regarding the user on the display 122. The operation processing unit 403 receives and processes, through the input unit 114, operation instructions from the user input from the hardware key 121 and the touch panel 120.

The authentication processing unit 404 receives a login/logout request from the user, and communicates with a user authentication server PC(1) 201 to perform authentication. The authentication server PC(1) 201 manages a user who uses the image processing apparatus 100.

<User Authentication Server PC(1)>

Figure 5:
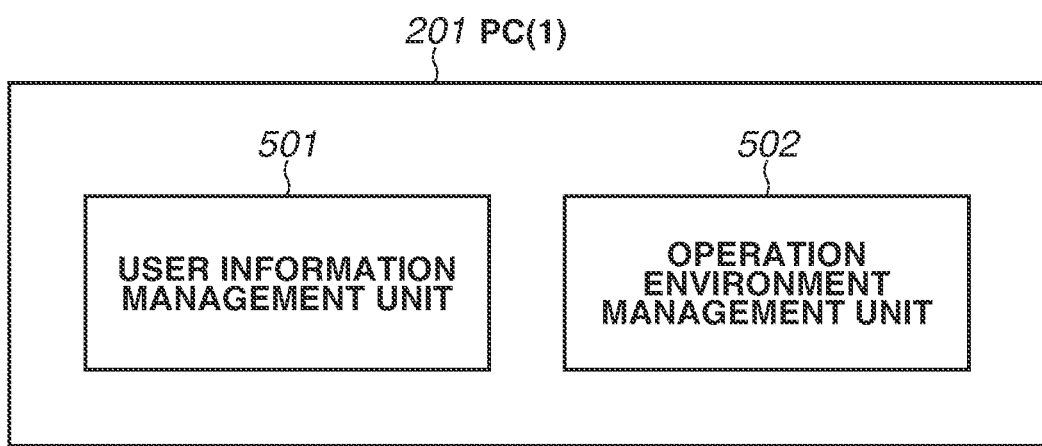
FIG. 5 is a block diagram illustrating a system configuration of a user authentication server.

FIG. 5 is a block diagram illustrating an example of functions of the PC(1) 201 illustrated in FIG. 2.

The PC(1) 201 described with reference to FIG. 3 is a user authentication server, and stores user information for authenticating a user such as a login user ID and a password. The user authentication server includes a user information management unit (user information management means) 501 and an operation environment management unit (operation environment management means) 502. The user information management unit 501 manages user-identification information (user ID) inquired via the communication I/F 306 from a terminal (another PC(2) 202 or the image processing apparatus 100) connected to the network 203.

The operation environment management unit 502 manages an operation environment of each user managed by the user information management unit 501. The operation environment management unit 502 manages information for customizing, for example, an operation screen displayed on the display 122 for each user, as the operation environment. By displaying the operation screen on the display 122 based on operation environment information when the user has logged into the image processing apparatus 100, it is possible to provide an easy-to-use operation screen for the user.

While the PC(1) 201 serving as the user authentication server includes the user information management unit 501 and the operation environment management unit 502 has been described in the above case, at least the user information management unit 501 or the operation environment management unit 502 can be included in the image processing apparatus 100.

<Processing from Input of Print Job to Press of Stop Key>

Figure 7:
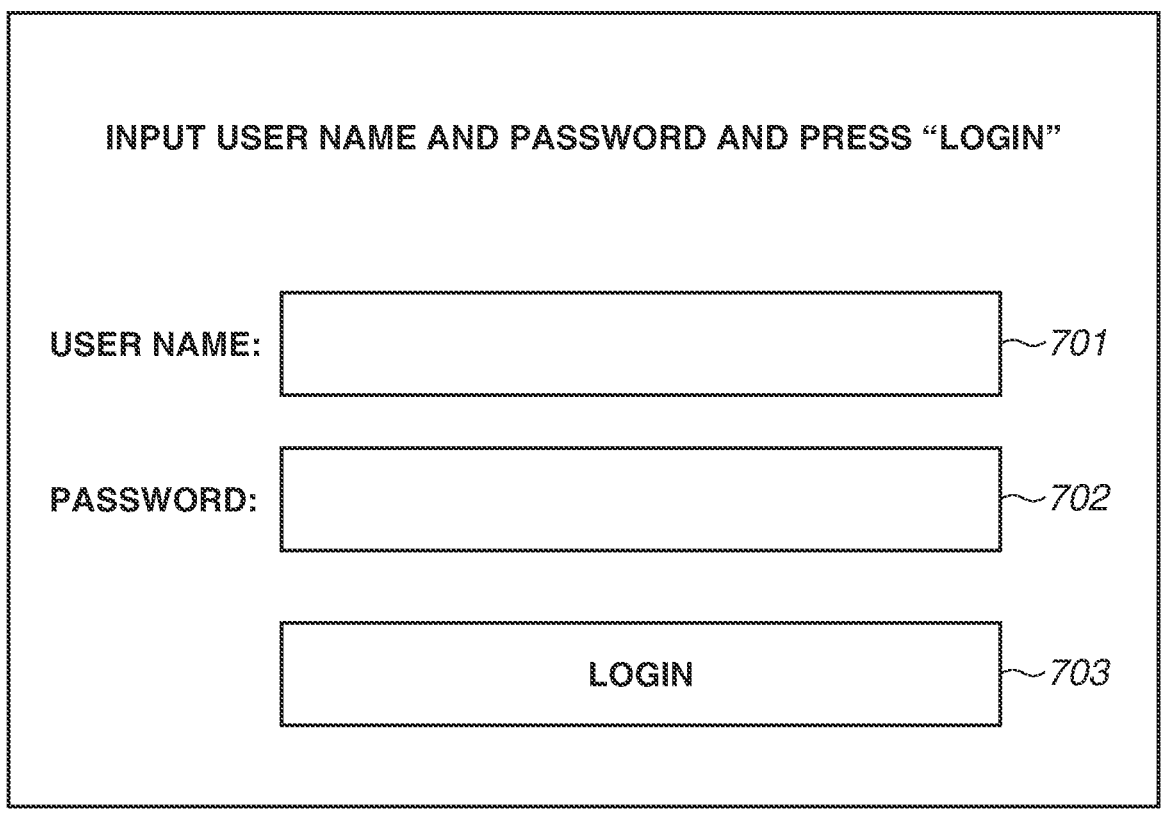
FIG. 7 illustrates an example of a login screen in the PC.
Figure 8:
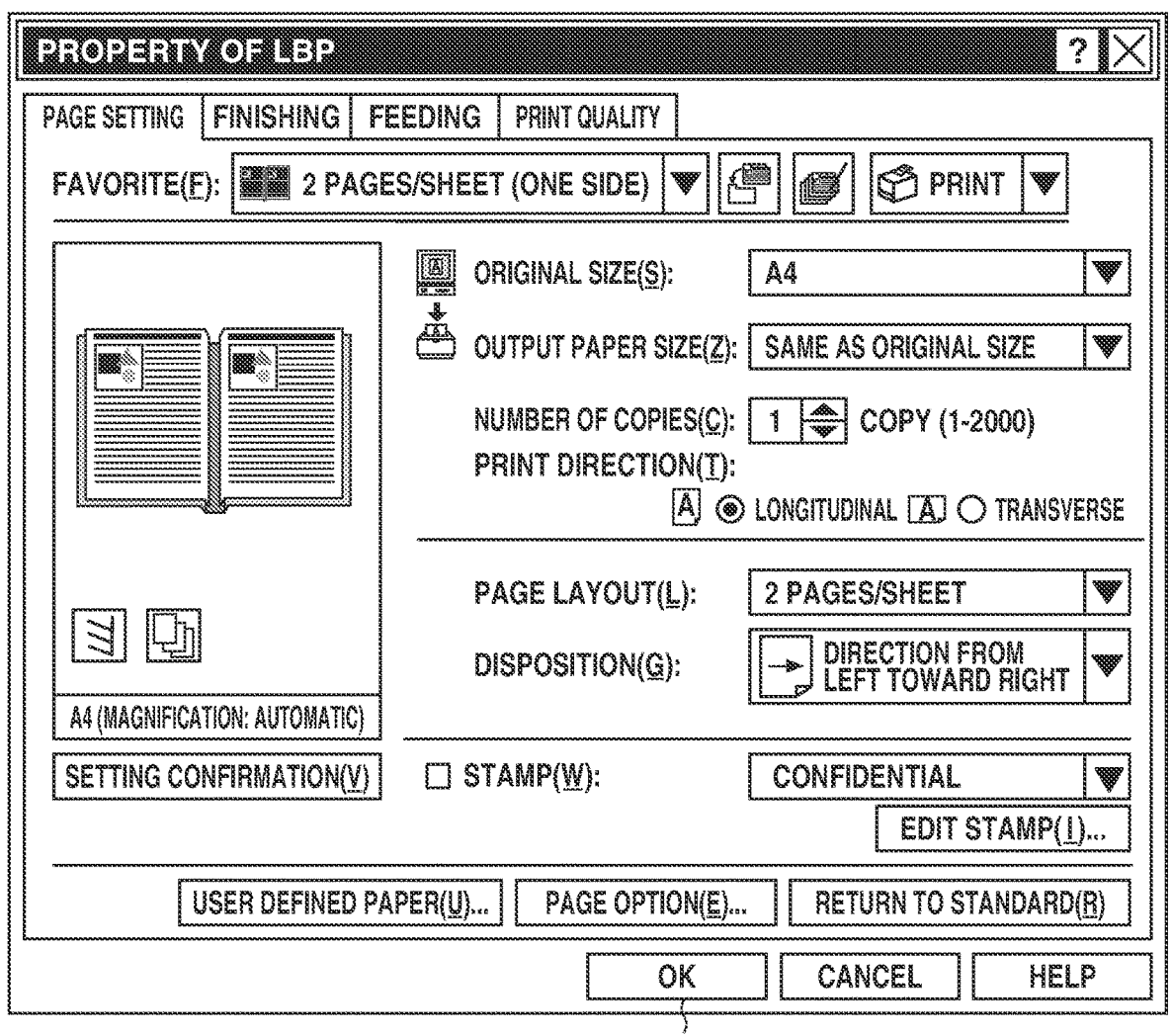
FIG. 8 illustrates an example of a print setting screen displayed on a display of the PC.

A flow from input of the print job to press of the stop key by the user in a user terminal PC(2) 202 will be described with reference to a flowchart of FIG. 6 and screens of FIGS. 7 and 8.

Figure 6:
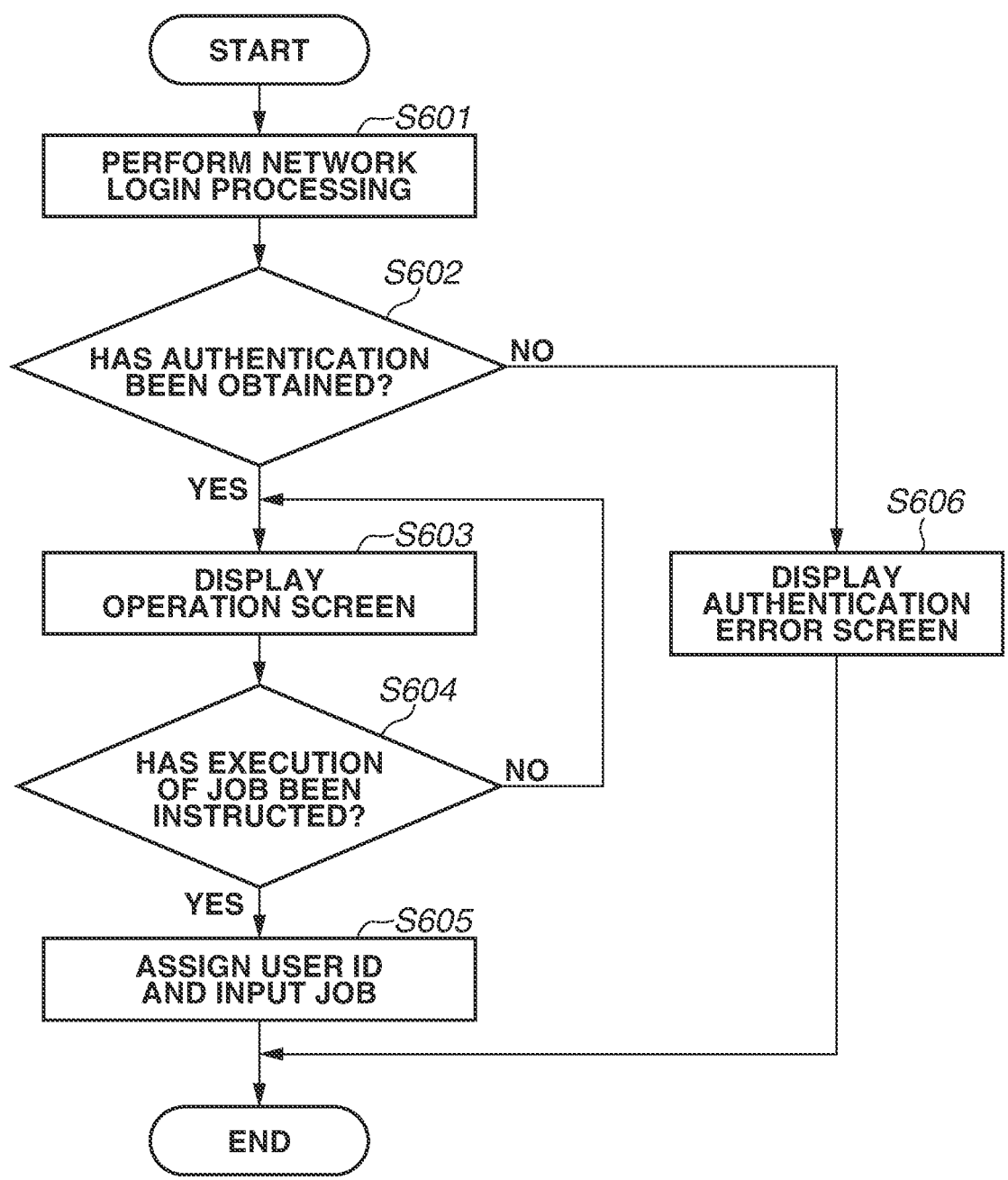
FIG. 6 is a flowchart illustrating processing from authentication to input of a job into the image processing apparatus.

FIG. 6 is a flowchart for describing processing when the user inputs the print job to the image processing apparatus 100 via the user terminal PC(2) 202 illustrated in FIG. 2.

In a case where the print job is input to the image processing apparatus 100 via the user terminal PC(2) 202, first in step S601, login processing is performed in the PC(2) 202. FIG. 7 illustrates an example of a login screen displayed on the output device 305 of the PC(2) 202. The user makes a login request, via the input device 304, by inputting a login user ID in a user name entry field 701 and a password in a password entry field 702, and by pressing a "login" button 703. The CPU 301 sends the user information to the user authentication server PC(1) 201 via the communication I/F 306. In the user authentication server PC(1) 201, the CPU 301 performs user authentication based on the user information, and sends user authentication information that indicates whether authentication can be obtained, to the user terminal PC(2) 202. Instead of using the input device 304 for inputting the user information, an authentication device such as an IC card reading device or a biometric authentication device using, for example, fingerprint information or vein information can be used.

In step S602, in the user terminal PC(2) 202, the CPU 301 confirms whether authentication has been obtained from the user authentication server PC(1) 201 based on the user authentication information. In a case where the authentication has not been obtained (NO in step S602), in step S606, the CPU 301 displays an authentication error screen on the output device 305, and the processing ends.

In a case where the authentication has been obtained (YES in step S602), in step S603, the CPU 301 displays an operation screen (terminal operation display screen) on the output device 305.

In step S604, the CPU 301 monitors whether execution of a print job has been instructed by the user performing a predetermined operation on the operation screen. FIG. 8 illustrates an example of a print setting screen by driver software displayed on the output device 305 of the PC(2) 202. The user performs input via the input device 304 to make a setting necessary for print, and instructs the execution of the print job. In FIG. 8, an "OK" button 801 corresponds to the instruction to execute the print job.

In a case where the execution of the print job is instructed (YES in step S604), the CPU 301 assigns a job execution user ID to the print job. In step S605, the PC(2) 202 inputs the print job to the image processing apparatus 100, in other words, transmits print data to the image processing apparatus 100, and the processing ends. The image processing apparatus 100 to which the print job is input executes processing for print (print job) based on the received print data. In a case where the execution of the print job is not instructed (NO in step S604), the processing returns to step S603, and the CPU 301 stands by while displaying the operation screen.

An operation of the image processing apparatus 100 that has received the print job transmitted from the user terminal PC(2) 202 by the processing in FIG. 6 will be described below. In a case where the print job is transmitted from the user terminal PC(2) 202 or the like to the image processing apparatus 100, the CPU 111 of the image processing apparatus 100 receives the job through the communication processing unit 401, and registers the job in a print job queue included in the job processing unit 402. The job processing unit 402 then sequentially reads jobs from the print job queue, and drives the printer 124 to execute print processing.

FIG. 9 is a diagram schematically illustrating the print job queue. Jobs transmitted from the user terminal PC(2) 202 or the like are sequentially input to the print job queue. Each job includes information of a job ID 901, a job execution user ID 902, a job name 903, a reception date and time 904, and a status 905.

The job ID 901 is identification information for uniquely identifying the job, and is uniquely assigned at a point when the job is input to the print job queue.

The job execution user ID 902 is identification information for uniquely identifying a user who inputs the job, and is included in data received by the communication processing unit 401. Specifically, the job execution user ID 902 is assigned in step S606 in FIG. 6.

The job name 903 is a name assigned to the job, and is included in job data received by the communication processing unit 401.

The reception date and time 904 is the date and time when the job is input to the print job queue.

The status 905 represents a current status of the job, and is any one of "executing", "idling", and "suspending". The "executing" "indicates that print processing for the job is currently being executed. The "idling" indicates that execution of the print processing for the job is awaited. The "suspending" indicates that the print processing for the job is being suspended by an operation from a user described below.

The job processing unit 402 sequentially reads "idling" jobs from the print job queue and drives the printer 124 to start the print processing, and at the same time, set the status 905 of the job to "executing". When the print processing for the job ends, the job processing unit 402 deletes the job from the print job queue and reads the next "idling" job to execute print processing. The job processing unit 402 repeatedly performs such a process.

<Authentication Processing in Image Processing Apparatus>

Figure 10:
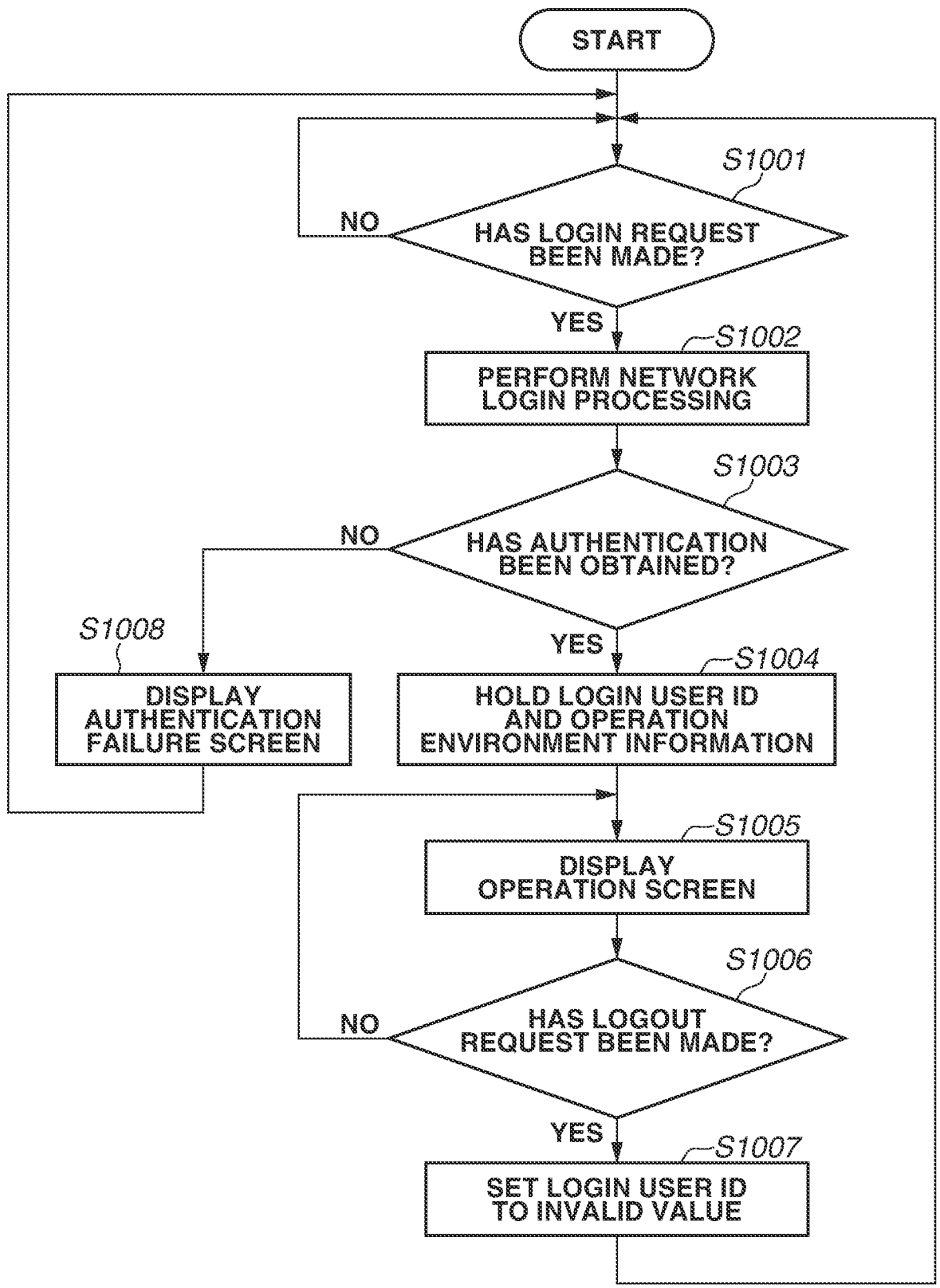
FIG. 10 is a flowchart illustrating login processing of the image processing apparatus.

Authentication processing in the image processing apparatus 100 will be described with reference to a flowchart of FIG. 10. The authentication processing in the flowchart of FIG. 10 is executed by the CPU 111 causing the respective functional units of the image processing apparatus 100 to perform functions of the respective functional units.

In step S1001, the CPU 111 determines whether a login request has been made. The login request is made when a login screen is displayed on the display 122, and the user inputs a login user ID and a password using the hardware key 121 and the touch panel 120.

Figure 11:
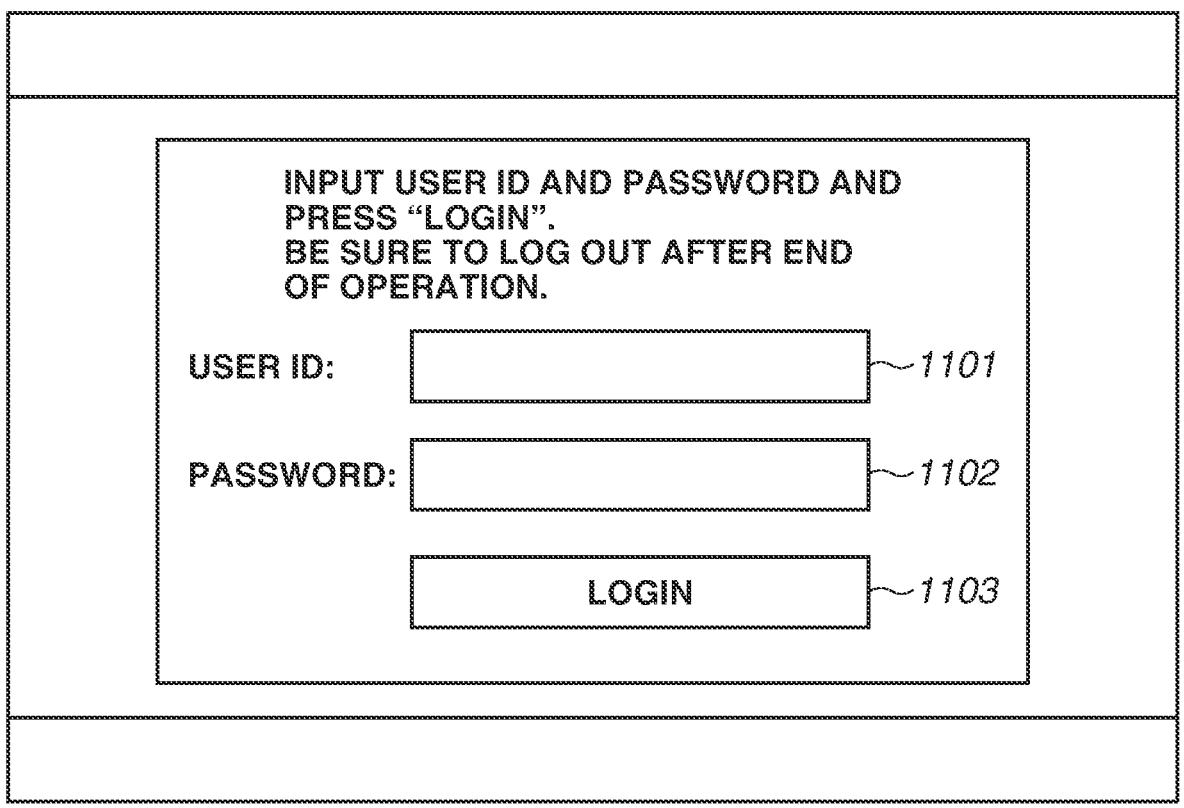
FIG. 11 illustrates an example of a login screen displayed on a display of the image processing apparatus.

FIG. 11 illustrates an example of a user authentication screen (login screen) displayed on the display 122. The user inputs a login user ID into a user ID entry field 1101 and a password in a password entry field 1102, and presses a "login" button 1103 to make a login request.

The login request can be made by input from an IC card reading device or a biometric authentication device using fingerprint authentication or the like connected to the image processing apparatus 100.

In a case where it is determined that the login request has been made (YES in step S1001), the processing proceeds to step S1002, and the CPU 111 performs network login processing for logging into the user authentication server PC(1) 201. Specifically, the user information input from the touch panel 120 or the hardware key 121 in step S1001 is sent to the user authentication server PC(1) 201 through the communication processing unit 401 and the communication I/F 306 by the CPU 111, and an authentication result is obtained.

In step S1003, the CPU 111 determines whether authentication has been obtained from the user authentication server PC(1) 201. In a case where the authentication has been obtained (YES in step S1003), the processing proceeds to step S1004, and in a case where the authentication has not been obtained (NO in step S1003), the processing proceeds to step S1008.

Figure 12:
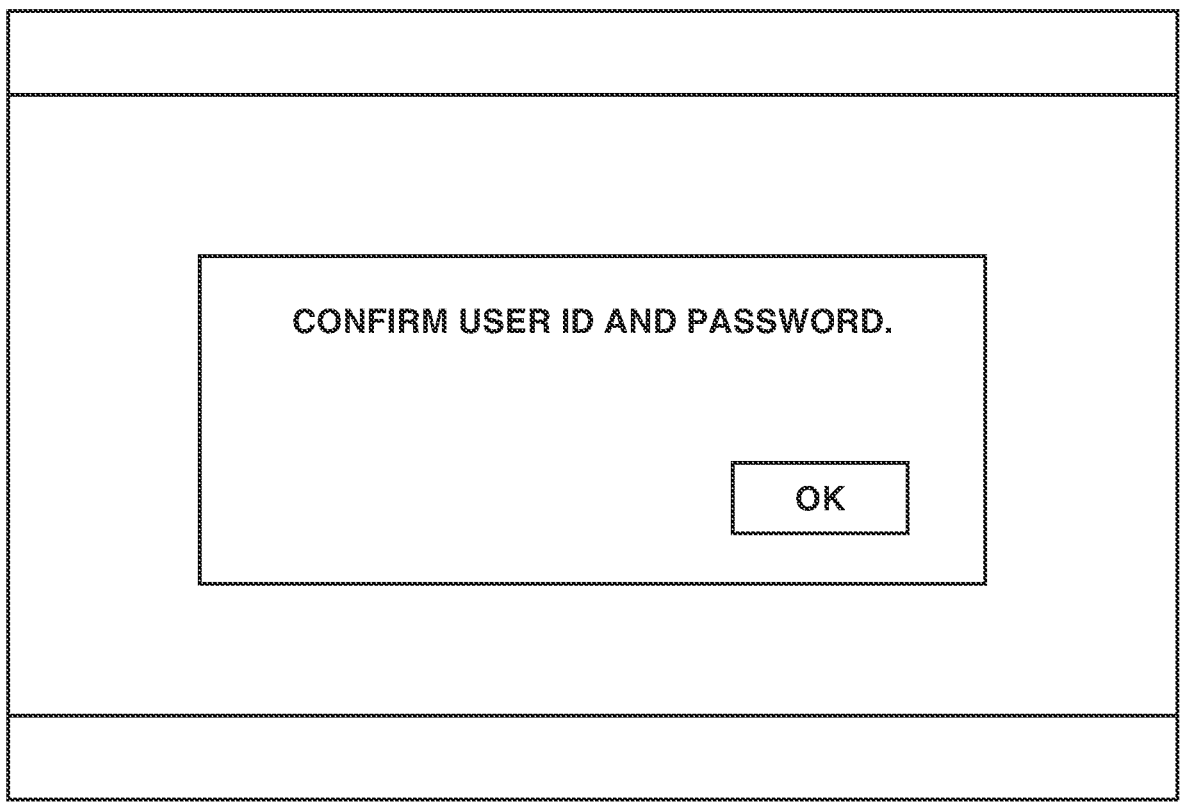
FIG. 12 illustrates an example of an authentication failure screen displayed on the display of the image processing apparatus.

In step S1008, the CPU 111 displays a screen indicating that the authentication has failed on the display 122 and the processing returns to step S1001, and the CPU 111 stands by for a login request. FIG. 12 illustrates an example of an authentication failure screen displayed on the display 122 in step S1008.

In step S1004, in a case where the authentication has been obtained, the CPU 111 stores the login user ID and operation environment information regarding the login user (who has the login user ID) acquired from the user authentication server PC(1) 201 in the RAM 112.

In step S1005, the CPU 111 displays an operation screen of the image processing apparatus 100 on the display 122.

Figure 13:
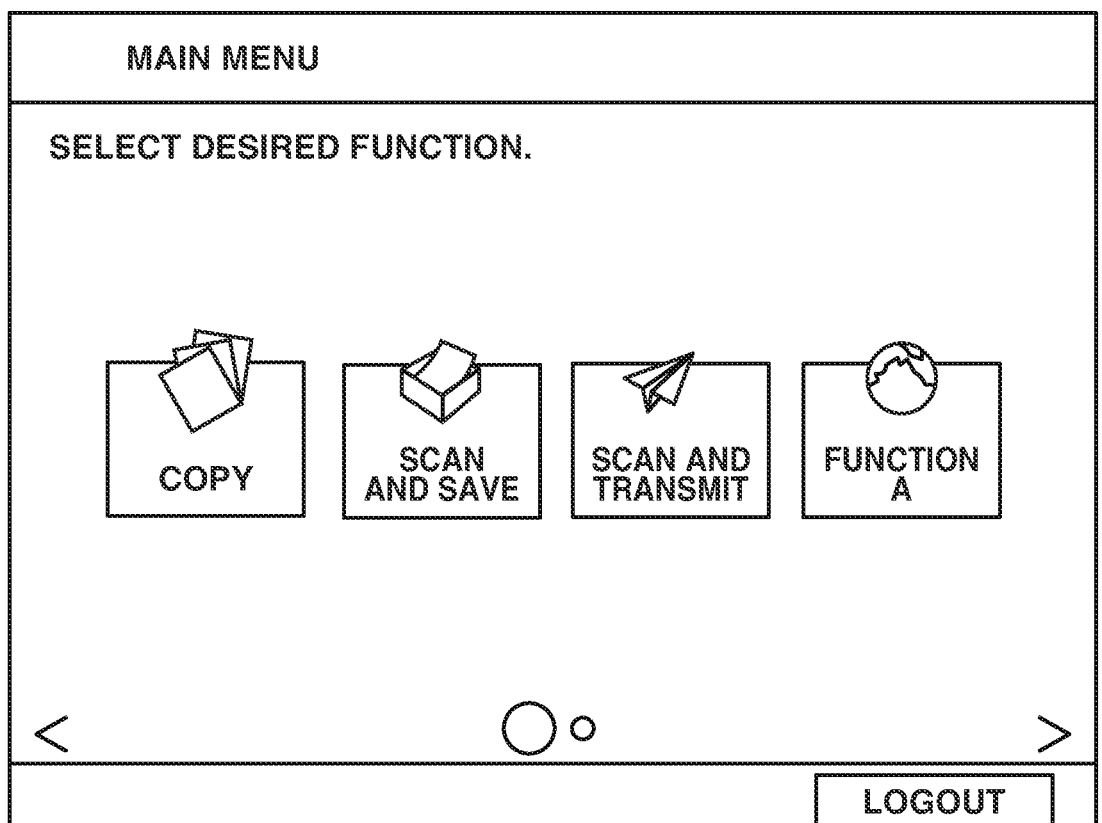
FIG. 13 illustrates an example of an operation screen of the image processing apparatus displayed on the display of the image processing apparatus.

FIG. 13 illustrates an example of a screen displayed on the display 122 in step S1005. The user can perform various operations of the image processing apparatus 100 by operating the displayed operation screen.

In step S1006, the CPU 111 determines whether a logout request has been made. The logout request is made in a case where a "logout" button 1301 on the operation screen displayed on the display 122 is pressed or in a case there is no operation input from the user for a predetermined period of time. In step S1007, in a case where it is determined that the logout request has been made (YES in step S1006), the CPU 111 discards the login user ID held in step S1004 and sets the login user ID to an invalid value (value indicating that the user is not logged into the image processing apparatus 100) and the processing returns to step S1001. Based on the processing described above, the CPU 111 (authentication processing unit 404) of the image processing apparatus 100 always ascertains whether there is a user who has logged into the image processing apparatus 100 and a login user ID of the login user.

<Suspension Processing>

Figure 14:
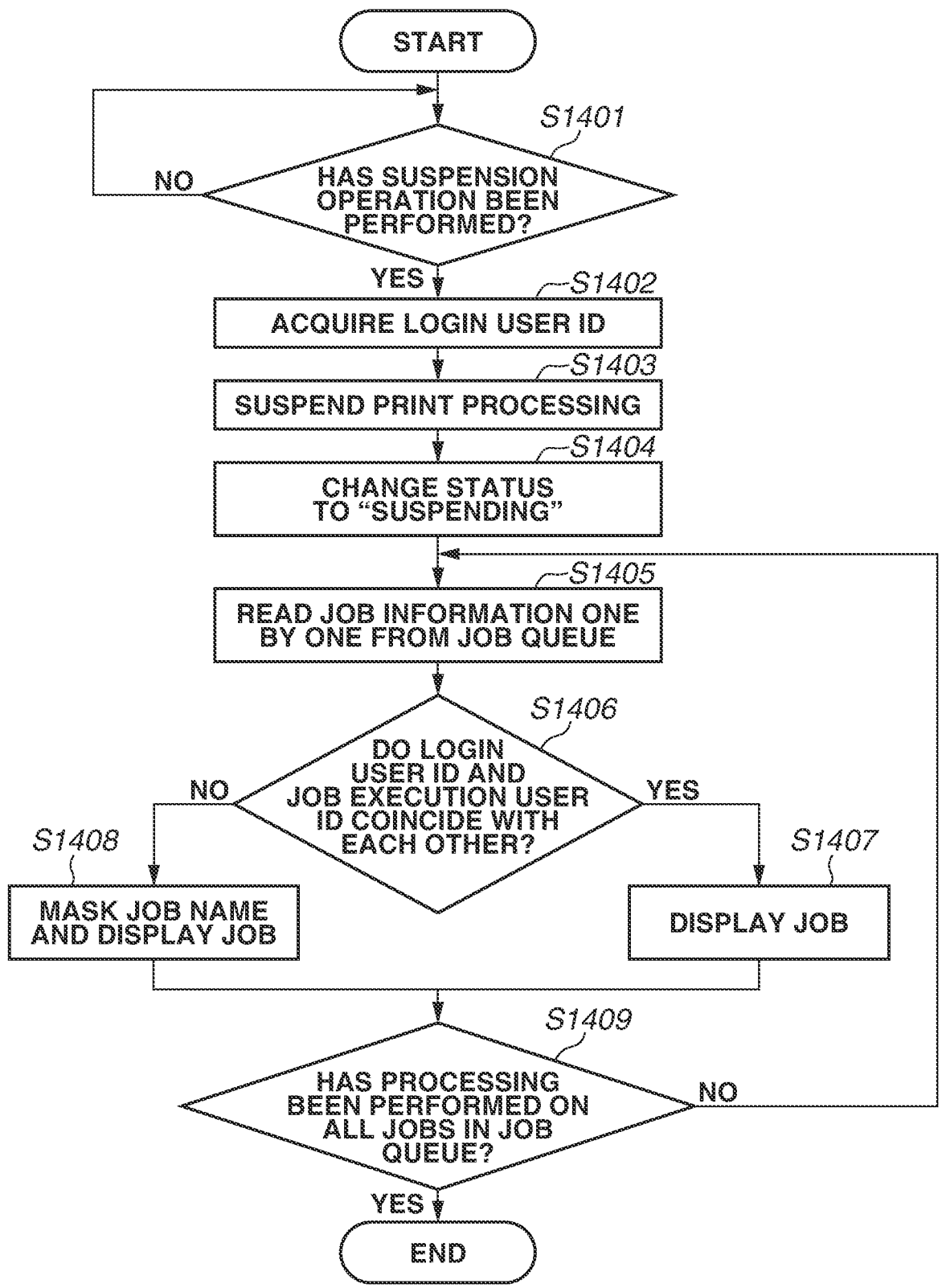
FIG. 14 is a flowchart illustrating a flow of job suspension processing of the image processing apparatus.

Print suspension processing in the image processing apparatus 100 will be described with reference to a flowchart of FIG. 14. The print suspension processing in the flowchart of FIG. 14 is realized by the CPU 111 executing the processing of the respective functional units of the image processing apparatus 100.

In step S1401, the CPU 111 determines whether a job suspension operation has been performed by a user. Specifically, the CPU 111 determines whether the stop key provided as one of the hardware keys 121 has been pressed. Alternatively, a stop button may be provided as a software key on the operation screen displayed on the display 122, and the CPU 111 can determine whether the stop button has been pressed.

In a case where the CPU 111 determines that the suspension operation has been performed (YES in step S1401), in step S1402, the CPU 111 acquires a login user ID of the user who is logged into the image processing apparatus 100. The login user ID is stored in step S1004 of the flowchart of FIG. 10. In a case where the user has not logged in at this time, while the login user ID is invalid in step S1007, the suspension processing continues. In a case where the login user ID is invalid, the acquired login user ID is a fixed value of "-----", for example.

In step S1403, the CPU 111 suspends the print processing of an "executing" job and all "idling" jobs in the print job queue. Specifically, the CPU 111 performs output processing of papers already fed into the image processing apparatus 100 to prevent the papers from remaining in the image processing apparatus 100, and performs control for preventing papers from being newly fed to the image processing apparatus 100.

In step S1404, a status of the read job is changed to "suspending".

In step S1405, the CPU 111 reads job information one by one from the print job queue. In step S1406, the CPU 111 determines whether the login user ID and the job execution user ID 902 of the job read from the print job queue coincide with each other. For example, in a case where the login user ID of the user who is logged into the image processing apparatus 100 is "user_00", the CPU 111 determines the job execution user ID 902 of "user_00" of the job in the print job queue coincides with the login user ID. When the CPU 111 determines that the login user ID and the job execution user ID 902 coincide with each other (YES in step S1406), the processing proceeds to step S1407. When the CPU 111 determines that the login user ID and the job execution user ID do not coincide with each other (NO in step S1406), the processing proceeds to step S1408. Also in a case where an invalid login user ID is acquired in step S1402, the CPU 111 determines that the login user ID does not coincide with the job execution user ID 902, and the processing proceeds to step S1408.

In step S1407, the CPU 111 adds a job in which it is determined that the login user ID and the job execution user ID 902 coincide with each other in step S1406 on a job list screen (described below) and the CPU 111 displays the job list screen. Then the processing proceeds to step S1409.

In step S1408, the CPU 111 masks a job name 903 of a job about which it is determined that the login user ID and the job execution user ID 902 do not coincide with each other in step S1406 and adds the job name 903 on the job list screen. Then the processing proceeds to step S1409. In order to mask and display the job name 903, the job name may be displayed with a fixed character string "*****" or can be displayed with blank. In this way, it is possible for the user to immediately distinguish between a job of a user who is logged into the image processing apparatus 100 and a job of a user who has not logged into the image processing apparatus 100.

In step S1409, the CPU 111 determines whether processing has been performed on all the jobs in the print job queue. When the CPU 111 determines that there is an unprocessed job (NO in step S1409), the processing returns to step S1405, and the CPU 111 reads next job information from the print job queue. When the CPU 111 determines that the processing of all the jobs is completed (YES in step S1409), the processing ends.

Figure 15:
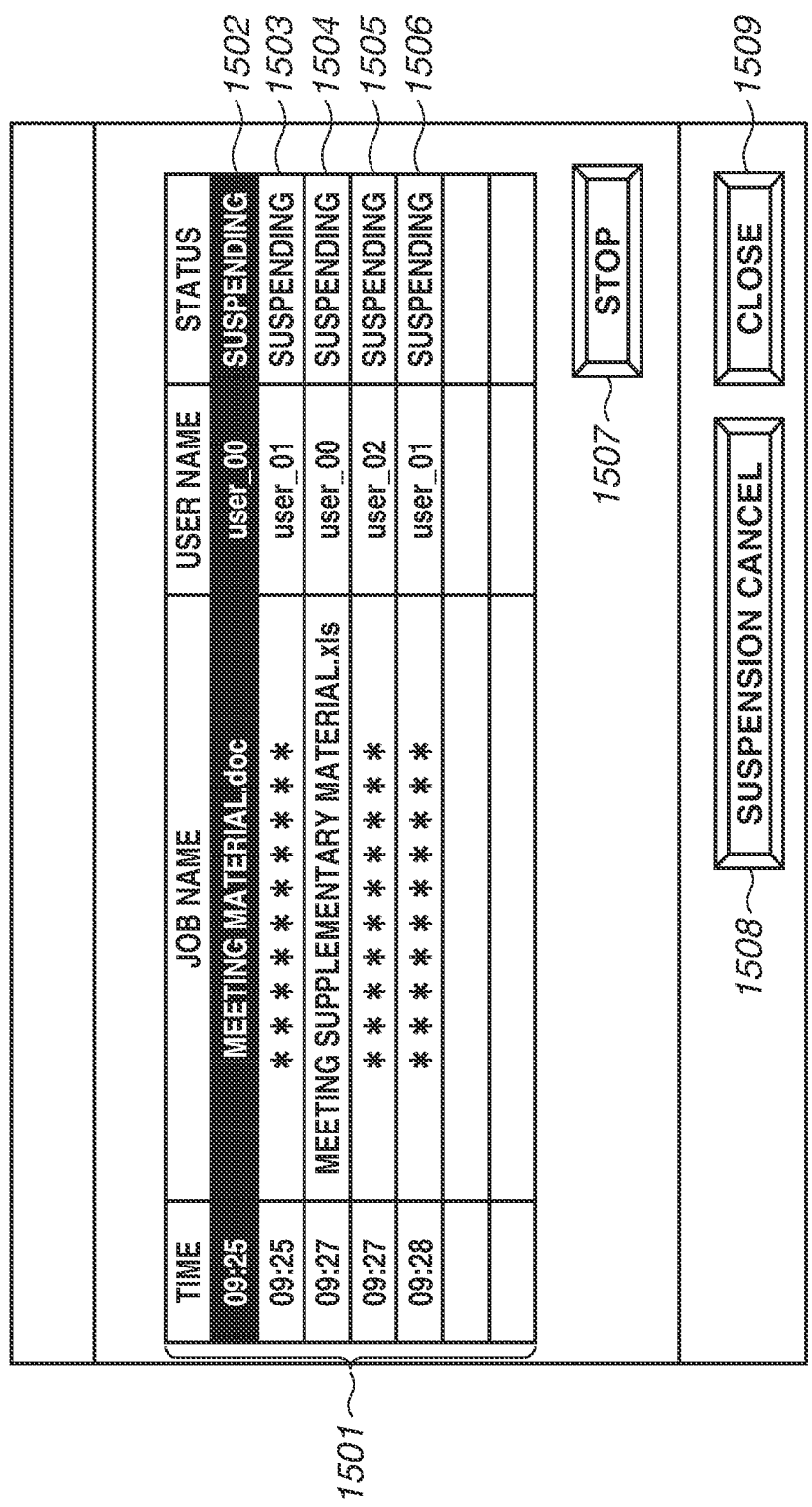
FIG. 15 illustrates an example of a job list screen of the image processing apparatus.

FIG. 15 illustrates an example of the job list screen displayed on the display 122 in steps S1407 and S1408. In a print job list 1501, times when the respective jobs are received, job names of input jobs, user names indicating job execution user IDs, and execution statuses are displayed based on contents of the print job queue. This is a screen example in a case where a user having a job execution user ID "user_00" is logged into the image processing apparatus 100 and performs a print suspension operation. Job names of jobs 1502 and 1504 whose job execution user ID 902 is "user_00" are displayed in the list, and job names of jobs whose job execution user IDs 902 are "user_01" and "user_02" are displayed with fixed character strings of "**********". Each row of the print job list 1501 is selectable, and a selected row is highlighted. In this example, the job 1502 is selected.

A button 1507 is a stop button, and when the button 1507 is pressed, print stop processing described below is performed. A suspension cancel button is denoted by reference numeral 1508. When the suspension cancel button is pressed, the CPU 111 cancels suspension of suspended jobs (the jobs 1502 to 1506 in the screen example in FIG. 15), and sets these jobs to an executing or idling state. A "close" button 1509 is a button for closing the screen. When the close button is pressed, the CPU 111 cancels suspension of the suspended jobs and sets these jobs to an executing or idling state as in the case where the "suspension cancel" button 1508 is pressed. Then the CPU 111 closes the screen.

<Stop Processing of Job>

Figure 16:
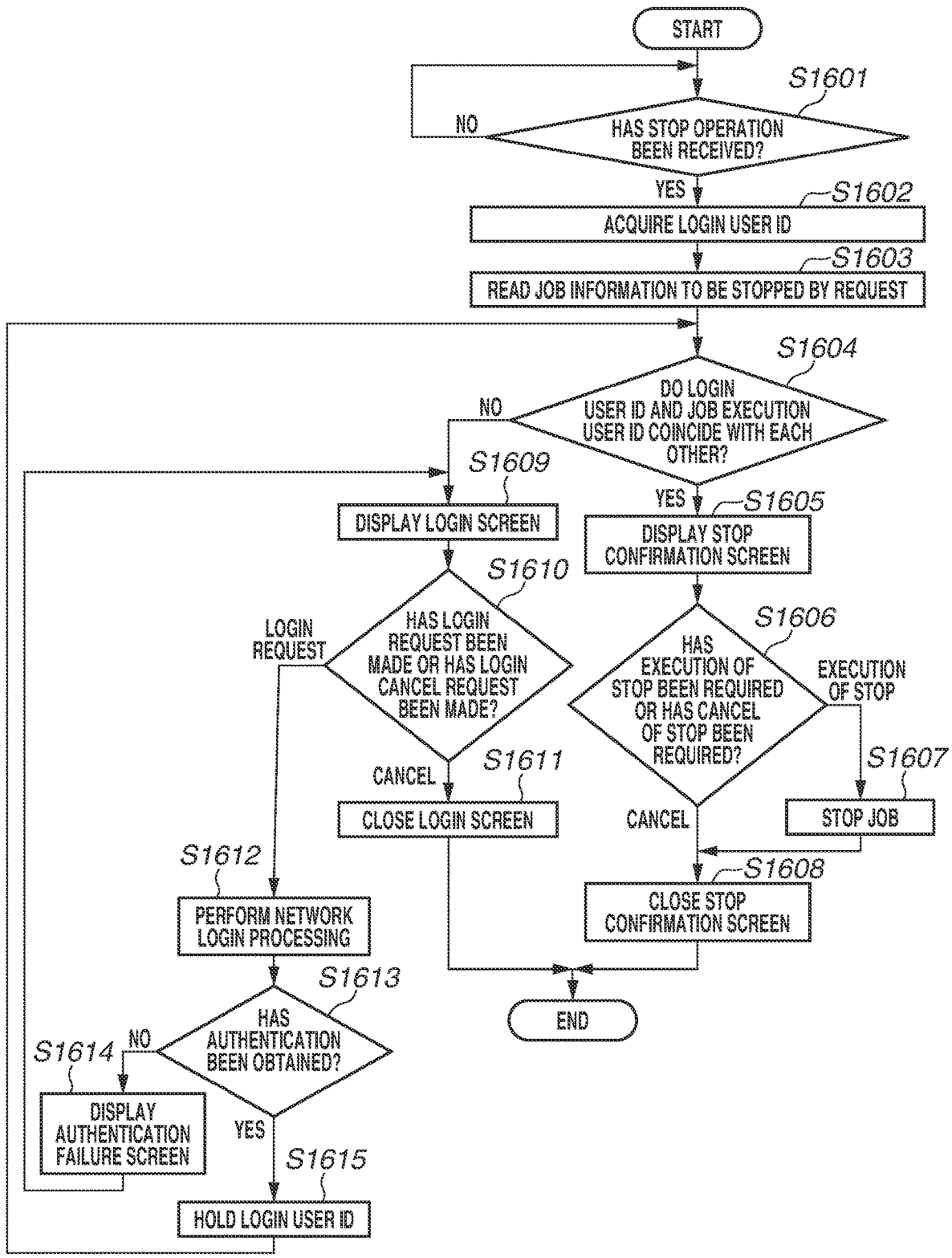
FIG. 16 is a flowchart illustrating a flow of job stop processing of the image processing apparatus.

Stop processing of a suspended job in the image processing apparatus 100 will be described with reference to a flowchart of FIG. 16. The stop processing of the suspended job in the flowchart of FIG. 16 is realized by the CPU 111 executing the processing of the respective functional units of the image processing apparatus 100.

In step S1601, the CPU 111 determines whether a job stop operation has been performed by a user. Specifically, the CPU 111 determines whether the "stop" button 1507 in FIG. 15 has been pressed. When determining that the job stop operation has been performed (YES in step S1601), the CPU 111 acquires a login user ID of a user who is logged into the image processing apparatus 100 in step S1602, and stores the login user ID in another area of the RAM 112. The login user ID is stored in step S1004 of the flowchart of FIG. 10. Instead, the login user ID acquired in step S1402 of the flowchart of FIG. 14 can be used. In step S1603, the CPU 111 reads job information to be stopped by the request, from the print job queue.

In step S1604, the CPU 111 determines whether the login user ID and the job execution user ID 902 of the job read from the print job queue coincide with each other for a selected job.

In a case where the CPU 111 determines that the login user ID and the job execution user ID 902 coincide with each other (YES in step S1604), the processing proceeds to step S1605. In a case where the CPU 111 determines that the login user ID and the job execution user ID 902 do not coincide with each other (NO in step S1604), the processing proceeds to step S1609. In a case where an invalid login user ID is acquired in step S1602, the CPU 111 determines that the login user ID does not coincide with the job execution user ID 902, and the processing proceeds to step S1609.

Figure 17:
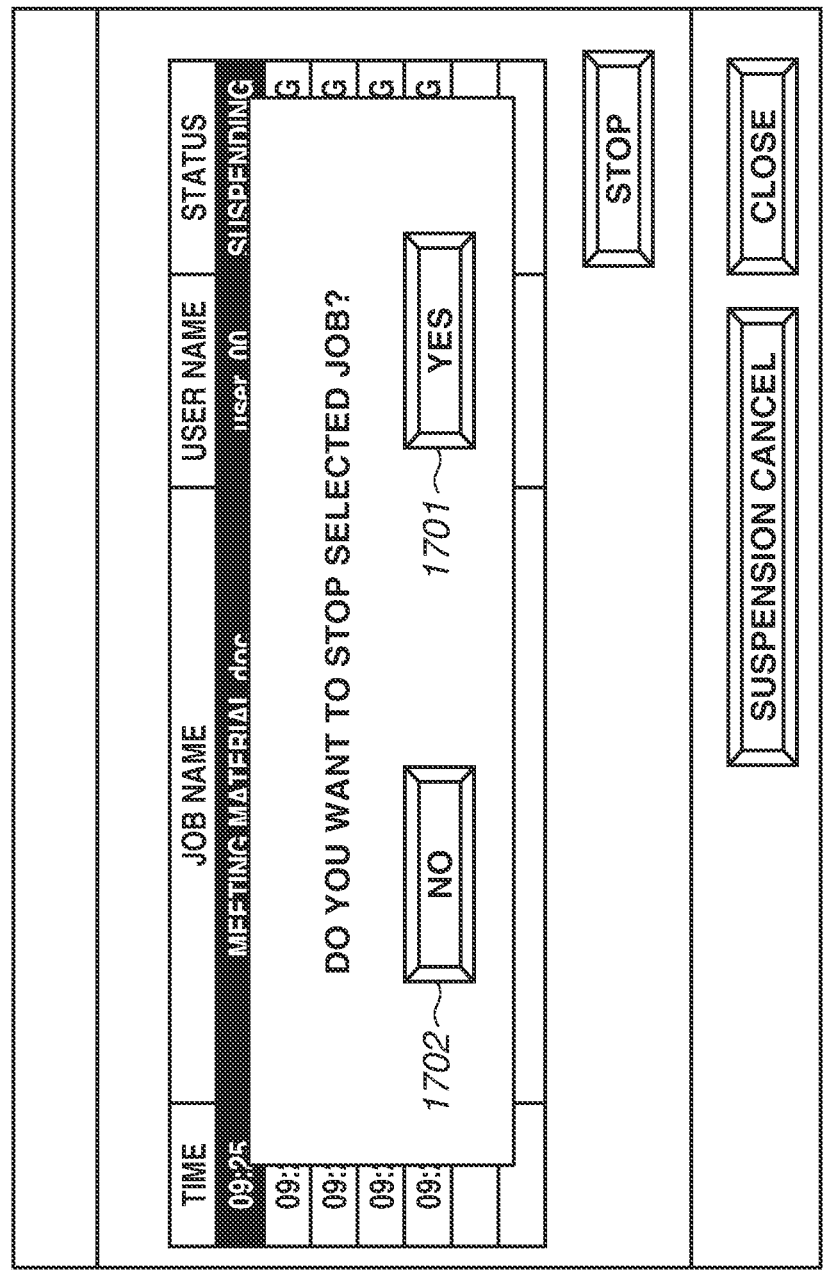
FIG. 17 illustrates an example of a print stop confirmation screen displayed on the display of the image processing apparatus.

In step S1605, the CPU 111 displays a stop confirmation screen as illustrated in FIG. 17. In step S1606, the CPU 111 determines whether execution of job stop has been requested or cancel of the job stop has been requested. Specifically, in a case where a "YES" button 1701 in FIG. 17 is pressed, the CPU 111 determines that the execution of the job stop has been requested (EXECUTION OF STOP in step S1606), and the processing proceeds to step S1607. In a case where a "NO" button 1702 is pressed, the CPU 111 determines that the cancel of the job stop has been requested (CANCEL in step S1606), and the processing proceeds to step S1608.

In step S1607, the CPU 111 deletes the selected job from the print job queue.

In step S1608, the CPU 111 closes the stop confirmation screen and returns to the original screen (FIG. 15), and the processing ends. The image processing apparatus 100 sets a user who has logged into the image processing apparatus 100 when the job stop operation illustrated in step S1601 has been instructed, as a login user, and displays the screen in FIG. 15.

Figure 18:
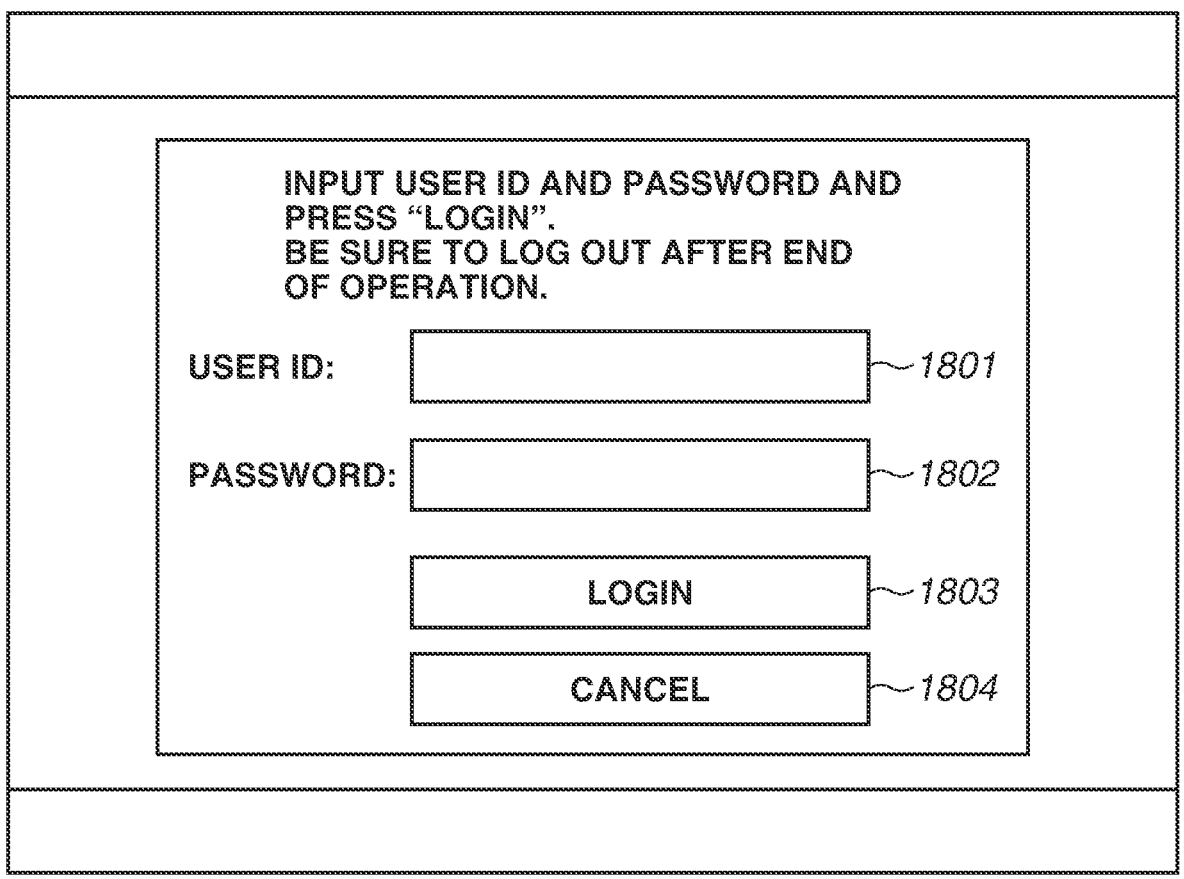
FIG. 18 illustrates an example of a cancelable login screen displayed on the display of the image processing apparatus.

In step S1609, in a case where the login user ID and the job execution user ID 902 of the job read from the print job queue do not coincide with each other (NO in step S1604), the CPU 111 displays a user authentication screen (login screen) as illustrated in FIG. 18. A box 1802 and a box 1802 are input boxes for inputting User ID and password respectively. A button 1803 is a login button, and a button 1804 is a cancel button. In step S1610, the CPU 111 determines whether a login request has been made or a login cancel request has been made. Specifically, in a case where the "login" button 1803 is pressed, the CPU 111 determines that the login request has been made (LOGIN REQUEST in Step S1610), and the processing proceeds to step S1612. The login request can be made by input from an IC card reading device or a biometric authentication device using fingerprint authentication or the like connected to the image processing apparatus 100. In a case where the "cancel" button 1804 is pressed, the CPU 111 determines that the login cancel request has been made (CANCEL in step S1610), closes the login screen in step S1611, and returns to the original screen (FIG. 13), and processing ends.

In step S1612, the CPU 111 performs network login processing for logging into the user authentication server PC(1) 201. In step S1613, the CPU 111 confirms whether authentication has been obtained from the user authentication server PC(1) 201. In a case where the authentication has been obtained (YES in step S1613), the processing proceeds to step S1615. In a case where the authentication has not been obtained (NO in step S1613), in step S1614, the CPU 111 displays the screen indicating that the authentication has failed as illustrated in FIG. 12, and the processing returns to step S1609.

In step S1615, the CPU 111 temporarily stores the login user ID used for logging into the user authentication server PC(1) 201 in the RAM 112, and the processing returns to step S1604. In step S1615, the login user ID of the login user stored in the RAM 112 in step S1602 is simply rewritten to the login user ID of the login user authenticated in step S1613. Login processing (for example, acquisition processing of the operation environment information) for the user authenticated in step S1613 is not performed. In this way, after the job is stopped by the user authenticated to stop the job in step S1613, the user who has logged into the image processing apparatus 100 when the stop key is pressed can resume use of the image processing apparatus 100.

After step S1615, the processing of steps S1405 to S1409 in FIG. 14 can be executed to rewrite and display the job list illustrated in FIG. 15, so that the user can again select a job to be stopped. In this way, a job displayed like "*****" in FIG. 15 of a user who has tried to perform stop processing by interruption is displayed in detail. Thus, an interrupting user can appropriately select the job to stop.

In the present exemplary embodiment, after the processing in step S1611 or step S1608 in FIG. 16 is completed, the image processing apparatus 100 executes the processing in steps S1402 and S1405 to S1409 in FIG. 14 to display a job list screen. In this way, after a user other than the login user executes the job stop operation, the login user who has been using the image processing apparatus 100 when the stop key is pressed can use the image processing apparatus 100 without again logging in to the image processing apparatus 100.

In the present exemplary embodiment, when the processing illustrated in FIG. 14 is executed, a job name of a job of the user other than the login user is masked and displayed. However, all the jobs included in the print job queue can be displayed on a list without performing the processing of steps S1406 and S1408 of FIG. 14. In this case, job names of all the jobs are displayed on the job list screen illustrated in FIG. 15. On the job list screen illustrated in FIG. 15, the processing in a case where the job of the user other than the login user is selected is similar to that in FIG. 16.

In the present exemplary embodiment, when a suspension instruction such as pressing of the stop key is made during execution of the print job, the job list screen of the print jobs illustrated in FIG. 15 is displayed. On the job list screen of FIG. 15, jobs other than the print jobs, for example, a copy job, a scan job, and a transmission job can be added to the list to be displayed.

According to the processing described in the present exemplary embodiment, even in a case where another user other than a user who has input a job is logged into the image processing apparatus or in a case where a user stopping the job is not logged into the image processing apparatus, it is possible to stop, after appropriately performing authentication, the suspended job while the job is suspended.

With the image processing apparatus according to the present exemplary embodiment, even in a case where another user other than a user who has input a job is logged into the image processing apparatus or in a case where the user has not yet logged into the image processing apparatus, it is possible to stop the suspended job after appropriately performing authentication.

OTHER EMBODIMENTS

Embodiments can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-017492, filed Feb. 2, 2018, which is hereby incorporated by reference herein in its entirety.

What is claimed is:
1. An image processing apparatus comprising:
a display;
at least one memory storing instructions; and
at least one processor that, upon execution of the instructions is configured to:
receive at least one job that, when executed, controls the image processing apparatus to perform further processing, each of the at least one job including job-specific user-identification information identifying the user that submitted the job;
store, in the at least one memory, each received job and job-specific user-identification information received with the job in association with one another;
acquire user-identification information for a user who is logged into the image processing apparatus;
display, on the display, a job list screen in response to a user instruction;

stop a particular job listed on the job list screen based on a selection received via the display; and determine whether the acquired user-identification information for the logged in user and the job-specific user-identification information identifying the user who submitted the selected job coincide with each other; and displaying, on the display, a user authentication screen requesting further authentication based on a determination that the acquired user-identification information does not coincide with the job-specific user-identification information.

2. The image processing apparatus according to claim 1, wherein execution of the instructions further configures the one or more processors to stop the job selected on the job list screen based on a determination that the acquired user-identification information and the job-specific user-identification information coincide with each other.

3. The image processing apparatus according to claim 1, wherein execution of the instructions further configures the one or more processors to receive further user identification information via the authentication screen and temporarily store the further user identification information based on a determination that the acquired user-identification information and job-specific user-identification information do not coincide with each other.

4. The image processing apparatus according to claim 1, wherein execution of the instructions further configures the one or more processors to display, on the display, a screen requesting confirmation to stop the selected job on the job list screen.

5. The image processing apparatus according to claim 1, further comprising:
a printer configured to print an image on a print sheet; and
wherein execution of the instructions further configures the at least one processor to suspend formation of the image by the printer in response to the user instruction.

6. The image processing apparatus according to claim 1, wherein the user instruction is received via a stop key or a stop button displayed on an operation screen.

7. The image processing apparatus according to claim 1, wherein in a case where no user is logged into the image processing apparatus, the user-identification information of the user who is logged into the image processing apparatus is set to an invalid value.

8. A method for controlling an image processing apparatus including a display and a storage, the method comprising:
receiving at least one job that, when executed, controls the image processing apparatus to perform further processing, each of the at least one job including job-specific user-identification information identifying the user that submitted the job;
store, in the storage, each received job and job-specific user-identification information received with the job in association with one another;
acquiring user-identification information for a user who is logged into the image processing apparatus;
displaying, on the display, a job list screen in response to a user instruction;
stopping a particular job listed on the job list screen;
determining whether the acquired user-identification information for the logged in user and the job-specific user-identification information identifying the user who submitted the selected job coincide with each other; and
displaying, on the display, a user authentication screen requesting further authentication based on a determination that the acquired user identification information does not coincide with the job-specific user identification information.

9. The method according to claim 8, further comprising:
stopping the job selected on the job list screen based on a determination that the acquired user-identification information and the job-specific user-identification information coincide with each other.

10. The method according to claim 8, further comprising:
receiving further user identification information via the authentication screen; and
storing, temporarily, the further user identification information based on a determination that the acquired user identification information and job-specific user-identification information do not coincide with each other.

11. The method according to claim 8, further comprising:
displaying, on the display a screen requesting confirmation to stop the selected job on the job list screen.

12. The method according to claim 8, wherein the image forming apparatus further includes a printer, and the method further comprises:
printing, by the printer, an image on a print sheet; and
suspending formation of the image, by the printer, in response to the user instruction.

13. The method according to claim 8, wherein the user instruction is received via a stop key or a stop button displayed on an operation screen.

14. The method according to claim 8, wherein in a case where no user is logged into the image processing apparatus, the user-identification information of the user who is logged into the image processing apparatus is set to an invalid value.

* * * * *